United States Patent Office 3,268,294
Patented August 23, 1966

---

3,268,294
PROCESS FOR PRODUCING SELENIUM DIOXIDE
Edward S. Roberts, 874 Woodward Ave., Ridgewood, N.Y., and Ludwig J. Christmann, 9 Center Knolls, Bronxville, N.Y.
No Drawing. Application May 11, 1962, Ser. No. 194,200, which is a continuation of applications Ser. No. 4,211, Jan 25, 1960, Ser. No. 5,360, Jan. 29, 1960, Ser. No. 15,049, Mar. 15, 1960, Ser. No. 19,460, Apr. 4, 1960, and Ser. No. 176,101, Feb. 27, 1962. Divided and this application June 10, 1965, Ser. No. 473,268
7 Claims. (Cl. 23—139)

This is a division of application Serial No. 194,200, filed May 11, 1962, which is a continuation of applications Serial No. 4,211, filed January 25, 1960, and now abandoned; Serial No. 5,360, filed Jaunary 29, 1960, and now abandoned; Serial No. 15,049, filed March 15, 1960, and now abandoned; Serial No. 19,460, filed April 4, 1960, and now abandoned and Serial No. 176,101, filed February 27, 1962, and now abandoned; all by the present inventors, which last-named application was a continuation-in-part of application Serial No. 7,533, filed February 9, 1960, and now abandoned.

The present invention is directed in one embodiment to the production of oxidized organic compounds.

One aspect of the invention involves oxidation of alkyl-aromatic compounds to aromatic carboxylic acids. Another aspect of the invention involves oxidation of polycyclic aromatic compounds to aromatic ketones.

In one embodiment, the invention is directed to the oxidation of acenaphthene and substitution products thereof wherein the substituents do not interfere with the oxidation. More specifically, the invention includes the production of quinones and polycarboxylic acids from the starting materials.

Heretofore, the quinone of acenaphthene was made by the reaction of acenaphthene with alkyl nitrites or nitrosyl chloride to form the oxime, which was then hydrolyzed to form the quinone. This process required a number of steps, the use of expensive reagents, and the efficiency of the conversion was relatively low.

In another prior art process, the acenaphthene was treated with sodium bichromate in acetic acid to form the quinone. But it suffered from the disadvantages that the medium was corrosive, the reagents were expensive, the yield was low and side reaction products were formed. In a modification of this process, the reactants in water solution were heated in an autoclave under substantial pressure; this had the additional disadvantage that expensive equipment was necessary and working under pressure had an element of danger. Another difficulty with oxidation reactions involving complex organic molecules is that readily condensible intermediate products are frequently formed in the first stages and undesirable condensation products are produced, which not only interfere with the desired reaction but also waste valuable materials and make purification of the desired product more difficult.

The present invention is intended and adapted to overcome the difficulties and disadvantages inherent in prior processes for producing oxidation products of acenaphthenes, it being among the objects thereof to devise a process for the above purpose which is simple and highly effective.

It is also among the objects of the invention to treat acenaphthenes so as to produce both quinones and polycarboxylic acids in relative purity and with higher yields.

In practicing the invention, there are utilized acenaphthene and its derivatives, such as 3,4-acenaphthene dicarboxylic acid. There may be present other substitutents on the ring provided that they remain inert and do not enter into or interfere with the desired reactions. Applicants have discovered that it is possible to oxidize the methylene (—$CH_2$—) groups by means of nitrogen dioxide ($NO_2$) to convert them essentially to CO groups. To accomplish this the starting material in solution in suitable solvents is heated to a sufficiently elevated temperature above that at which $N_2O_4$ is largely dissociated, and passing $NO_2$ through the solution, preferably with stirring. The $NO_2$ is reduced to NO and the acenaphthene is oxidized to quinone. It is noted that the red-brown color of the $NO_2$ fades out, and the NO formed in the reaction together with water of reaction are removed, the water condensed and the NO reoxidized for return to the reaction.

Applicants have found that for practical purposes the temperature of the reaction should be above about 125°–140° C. Preferably, temperatures in the neighborhood of 180°–225° C. are used, but the temperature should be kept below the decomposition point of the substances involved in the reactions. Also, it is preferable that the concentration of acenaphthene be low, as this insures that loss of ingredients by side reactions is practically eliminated.

Such solvents as are suitable for the process must be insert to nitrogen oxides at the elevated temperatures necessary for this process. The boiling points thereof should be substantially above the temperatures of the reaction at the pressures used in the operation. Relatively few solvents meet these requirements and, after considerable experimentation, it was found that the following solvents, which show a negligible reaction with $NO_2$, are suitable:

Mixed tetrachlorobenzenes
Trichlorobenzene
Dichlorobenzene
Monochlorobenze

Other solvents, which show some reaction with $NO_2$, but are still usable, are as follows:

Nitrobenzene
Diphenyl ether
Chlorinated diphenyls

While the above inert solvents have been found suitable, and are the best so far found, other solvents may also be used.

When oxidizing 3,4 acenaphthene dicarboxylic acid for instance, a charge of this substance amounting to 5% to 10% by weight of an inert solvent such as trichlorobenzene may be added to the solvent and heated to 190° C. before introduction of the $NO_2$. With provision for fine dispersion of the $NO_2$ as it is introduced and with sufficient time of contact of the gas with the liquid, reaction of the $NO_2$ to NO is virtually complete by the time the gas leaves the reactor until nearly all of the 3,4 acenaphthene dicarboxylic acid is oxidized to the quinone. The exit gases from the reactor contain virtually no $NO_2$ or free $O_2$. This allows the $H_2O$ arising from the oxidation of the acenaphthene derivative to be removed by condensation or condensation followed by drying with silica gel without loss of $NO_2$ or NO.

After drying of this gas stream, air or $O_2$ is introduced and mixed with it and the water-free NO—$O_2$ mixture passed into a silica gel bed which catalyses the oxidation of NO to $NO_2$ and adsorbs the $NO_2$. The $NO_2$ is then recovered from this silica gel bed by heating the bed, driving off the $NO_2$ as a gas for recycle to the oxidation process. This means that essentially, atmospheric oxygen is used as the oxidant and that $NO_2$ simply serves as a carrier of oxygen.

When oxidizing acenaphthene to the quinone by $NO_2$, it is desired to keep the acenaphthene concentration in the solvent low by adding the acenaphthene continuously at a rate proportioned to the $NO_2$ addition close to the theoretical proportion of one of acenaphthene to 4 $NO_2$ by weight. By proper selection of these rates according to the equipment used, it is here also possible to keep the quantity of $NO_2$ in the exit gases very low in relation to the NO in these gases. This allows the NO to be reoxidized to $NO_2$ and this $NO_2$ to be recovered and recycled as described above.

Acenaphthene quinone and acenaphthene quinone dicarboxylic acid or the imide of this dicarboxylic acid are important intermediates for the production of 1,8 naphthalene dicarboxylic acid (naphthalic acid) and 1,4,5,8 naphthalene tetracarboxylic acid, used in making dyestuffs and pigments.

The quinones so formed are then converted into the corresponding carboxylic acids or their anhydrides. It has been found by applicants that this may be accomplished by suspending the quinone in a relatively weak caustic soda solution containing slightly in excess of two mols of caustic per mol of acenaphthene quinone and then oxidized with NaOCl in solution in amount slightly in excess of one mol per mole of acenaphthenequinone. The same operation may be carried out on acenaphthene quinone dicarboxylic acid and 1,4,5,8 naphthalene tetracarboxylic acid produced therefrom.

The following are specific examples which will illustrate the invention without limiting the scope thereof.

*Example 1*

1400 cc. of trichlorobenzene were placed in a 3 liter resin flask provided with a center downdraft high speed propeller agitator near the bottom and with four vertical baffles around the periphery at the bottom and with a gas inlet tube leading down to a point just above the propeller.

Two hundred grams of acenaphthene were dissolved in 600 cc. of trichlorobenzene making approximately 780 cc. of solution. Sixty cc. of this solution were added to the resin flask and heated to 190° C. under agitation. $NO_2$ was introduced through the gas inlet tube at a rate of about 1.5 g./min. and the temperature maintained at 190° to 195° C. The remaining acenaphthene solution was dripped into the resin flask at such a rate as to give nearly complete elimination of $NO_2$ in the exist gases as judged by the color of these gases. The exit gases were cooled in an air condenser and the condensate collected. After 46 g. of water condensate were collected the $NO_2$ was shut off and the $NO_2$ was purged from the system with $N_2$.

The solvents of the resin flask were cooled and 138 g. of solids were separated from the solution. These solids were suspended in strong caustic and oxidized with $H_2O_2$. The product of this oxidation was neutralized with HCl after dilution and the solids separated and dried at 115° C. for 48 hours. This product showed a neutralization equivalent of 98.5 or approximately that of naphthalic anhydride.

*Example 2*

1400 cc. of mixed tetrachlorobenzenes were put in a 3 liter resin flask described in Example 1. Two hundred grams of acenaphthene were dissolved in 600 cc. of the tetrachlorobenzene. Sixty cc. of this solution were added to the resin flask and heated to 210° C. $NO_2$ was then admitted through the gas inlet tube at a rate of about 1.8 g./min. The remaining acenaphthene solution was continuously dripped in over a period of about 3 hours or at such a rate as to give virtually complete elimination of $NO_2$ in the exit gases. The temperature of the contents of the flask was allowed to go to about 225° C. during this addition. After purging the flask and its contents with $N_2$ the contents were removed, cooled, and the solids filtered off. The filter cake was reslurried in 1,000 cc. of isooctane, brought to a boil, cooled to room temperature, filtered and washed with an additional 500 cc. of isooctane to remove the tetrachlorobenzenes.

The solids were then dried. The weight recovered was 191 g. of dried solids. Thirty grams of these solids were dissolved in 100 cc. of hot nitrobenzene and recrystallized by cooling, separated by filtration, washed with methanol to remove the nitrobenzene and dried. This gave 26 g. of dry crystalline solids which were identified as acenaphthene quinone by the melting point.

The filtrate from the $NO_2$ oxidation described above was returned to the 3 liter resin flask with sufficient additional tetrachlorobenzene to make up the volume, and an additional 200 g. of acenaphthene was oxidized in the same way as described above. This procedure was repeated five more times with all the results summarized as follows:

| Run No. | Weight of Crude Product in grams | Amount recrystallized from 30 g. sample of crude product in nitrobenzene Weight in grams |
|---|---|---|
| 1 | 191 | 26 |
| 2 | 210 | 25.5 |
| 3 | 222 | 23 |
| 4 | 219 | 21 |
| 5 | 203 | 21.5 |
| 6 | 222 | 17 |
| 7 | 226 | 20 |

339 g. taken from a composite of runs 4, 5 and 6 were dissolved in 1130 cc. of hot nitrobenzene and recrystallized by cooling. The solids were separated by filtration, washed with 500 cc. of methanol to remove the nitrobenzene, dried and weighed. 272 g. of recrystallized quinone were recovered.

*Example 3*

A sample of the above 272 g. of acenaphthene quinone was oxidized to naphthalic acid as follows:

60 g. of quinone was mixed with 30 g. of NaOH and 560 cc. of 5.25% NaOCl solution and heated to a boil slowly, and diluted to 3000 cc. giving a pale yellow solution. $Na_2S_2O_5$ was added until a starch-iodide paper test showed no excess NaOCl. The solution was acidified with HCl, filtered, and the solids washed and dried over night at 115° C. 61 g. of dried white solids were recovered, having a neutralization equivalent of 99.3 or that of naphthalic anhydride.

*Example 4*

100 g. of 3,4 acenaphthene dicarboxylic acid were dissolved in 2000 cc. of trichlorobenzene in a 3 liter resin flask equipped as described in Example 1. This solution was heated to 190° C. and oxidized with $NO_2$ added at a rate of about 1.8 g./min. until the exit gases were the same color as the inlet $NO_2$. The reaction mixture was cooled, filtered and the solids washed with isooctane and dried.

87 g. of dry solids were recovered. 27 g. sample of this cake was mixed with 16 g. of NaOH and 260 cc. of 5.25% aqueous NaOCl solution heated slowly to boiling, diluted to 3 liters and the excess NaOCl removed by addition of $Na_2S_2O_5$ as indicated by a starch-iodide test. The solution was then acidified with HCl, the solids filtered off and washed with water and dried. The dry cake weighed 22 g. and showed a neutralization equivalent of 71.7 which lies between the tetracarboxylic acid of naphthalene and the dianhydride of this acid.

In another embodiment, the invention is directed to the treatment of alkyl naphthalenes, and more particularly to methyl naphthalenes, said treatment being for the purpose of producing oxidation products thereof, specifically carboxy naphthalenes.

In a prior art process 2-methyl naphthalene was treated with acetyl chloride in the presence of dichloroethane as a solvent and with boron fluoride as catalyst, whereby 2-methyl-6-acetyl naphthalene was formed. Then the product was treated with dilute nitric acid at elevated temperatures to form 2,6-naphthalic acid. This process had a number of deficiencies. There were a number of steps and intermediate operations necessary which resulted in losses and low yields. Side reaction products were formed and in no case was the final product largely the 2,6-naphthalic acid. The conditions of the reaction were critical; if the concentration of the nitric acid was too high, nitrated by-products were formed; if the excess of nitric acid was too high, degradation products of oxidation were formed; if the temperature was not sufficiently high, little or no 2,6-naphthalic acid was formed, and if the temperature was too high, heat decomposition was likely to take place.

It was also proposed to oxidize 1,6-dimethyl naphthalene by the use of potassium ferricyanide together with potassium hydroxide in two stages at elevated temperatures. This process required large amounts of reactants and the yield was very low. The resulting 1,6-naphthalene dicarboxylic acid was contaminated with large amounts of other substances so that recovery and purification thereof was quite difficult.

The present invention is intended and adapted to overcome the disadvantages inherent in prior processes of the type described, it being among the objects thereof to provide a process which is relatively simple and is highly effective in obtaining a high yield of oxidation product, and with recovery of the oxidant for reuse.

It is also among the objects of the invention to oxidize polyalkyl naphthalenes to produce polycarboxy derivatives thereof, particularly the di-carboxy compounds.

It is further among the objects of the invention to provide a process which results in products of relatively high purity and the isolation of which is simple.

In practicing the invention, there is utilized $NO_2$ as the oxidizing agent and in the gaseous form. The alkyl naphthalene is dissolved in a suitable solvent which is inert to the $NO_2$ at the temperatures used. Such solvents as the chlorobenzenes have been found suitable; while the mono- to hexa-chlorobenzenes are useful, it is preferable to use the di- to tetra-chlorobenzenes as being eminently suitable. Other solvents having the desired properties may also be used.

The temperature of the reaction is above that at which $N_2O_4$ is largely dissociated to $NO_2$ as the efficiency of the reaction is dependent on $NO_2$. Such temperatures are about 125°–140° C., but it is desirable to operate at higher temperatures to speed up the reaction, the maximum temperature being below that at which decomposition of products or reactants takes place. It has been found that temperatures above about 180° and up to about 225° C. are quite satisfactory.

Under the preferred conditions of operation, the $NO_2$ is passed through the solution of alkyl naphthalene at such a rate that it is substantially completely reduced to NO. This has the important advantage that it can be reoxidized to $NO_2$ very readily and by a simple operation, for recycling without loss of nitrogen oxides.

The following are specific examples of the operation of the present invention:

*Example 5*

The apparatus consists of a 3-liter resin flask fitted with a stirrer and having baffles along the sides to give effective agitation. Inlets are provided for both $NO_2$ and for the solution of the alkyl naphthalene, reaching to near the bottom of the flask. A reflux or other condenser attached to the top returns condensed vapors (other than water) to the flask. An overflow outlet near the top permits the exit of the oxidized mixture for further processing.

200 g. of 1,6-dimethyl naphthalene were dissolved in 2000 cc. of trichlorobenzene. The flask was heated to 160° C. and $NO_2$ was introduced into the bottom of the flask at the rate of 1.65 g. per minute and the temperature was raised gradually over one-half hour to 190° C., where the temperature was held for 1.5 hours while continuing the flow of $NO_2$. Then the rate of flow of $NO_2$ was increased to 2 g. per minute for an additional 1.5 hours. During the first two hours the effluent gases were a very pale yellow showing substantially complete reduction to NO, after which the color slowly deepened somewhat.

A total of 40 g. of water in vapor form was produced in the reaction and was condensed from the exit gases. The reaction mixture was cooled, the solid reaction product was separated therefrom by filtration, washed with naphtha to free it from the solvent, and dried. The dried solids weighed 120 g. and showed a N.E. (neutralization equivalent) of 131, indicating the presence of dibasic acid.

*Example 6*

Into the flask equipped as in Example 5, there was introduced 2000 cc. of trichlorobenzene and 10 g. of selenium (Se). The flask was heated to 105° C. and $NO_2$ was introduced to oxidize the Se to $SeO_2$. 200 g. of 1,6-dimethyl naphthalene were dissolved in the solution with stirring, causing the solid $SeO_2$ to dissolve forming a clear red solution. $NO_2$ was introduced at the rate of 2 g. per minute while maintaining the temperature between 185° and 198° C. until 41 cc. of water vapor was produced, which was condensed to separate the water from the exit gases, which remained practically colorless at the end of the reaction.

The contents of the flask were cooled, the solids removed therefrom by filtration, washed with isooctane to free them from the solvent, then washed with water, and dried. The product weighed 224 g. and showed a N.E. of 117. To convert the intermediate product to acid or anhydride, it was treated with NaOCl in NaOH aqueous solution, the excess NaOCl removed by the addition of $Na_2S_2O_5$ as shown by the starch-iodide test, and acidified to precipitate the substantially pure acid product, which showed a N.E. of 108.

*Example 7*

200 g. of 2,6-dimethyl naphthalene were dissolved in 2000 g. of trichlorobenzene in the flask described in Example 5, and heated to 185° C. $NO_2$ was introduced at the rate of about 2 g. per minute, the temperature being raised to 193° C. over one hour, then lowered to 191° C. over the remaining 2.5 hours.

The exit gases were colorless over the first hour and then gradually became reddish by the end of the reaction. 41 g. of water were obtained as a condensate. The contents of the flask were cooled, the solids separated by filtration, washed with isooctane, then with water, and dried. The product weighed 238 g. and showed a N.E. of 116.3.

*Example 8*

10 g. of Se in 2400 cc. of trichlorobenzene were oxidized as described in Example 6 in the flask described in Example 5. 100 g. of 2,6-dimethyl naphthalene were introduced into the flask causing the $SeO_2$ to be immediately reduced to Se, as shown by the disappearance of the solid $SeO_2$ slurry and the formation of a clear red solution.

$NO_2$ gas was introduced at the rate of 1.5 to 1.6 g. per minute until 24 g. of condensed water was collected from the exit gases. The temperature was permitted to rise from 185° C. to 200° C. at the end of the reaction. The exit gases were practically colorless showing practically complete reduction of $NO_2$ to NO. The latter was dried by contact with silica gel, then mixed with air and passed through silica gel to reoxidize it to $NO_2$ for reuse in the cycle.

The contents of the flask were cooled, the solids separated by filtration, washed with isooctane and then with water, and dried. The product weighed 111 g. and showed a N.E. of 154; it was a very light cream color.

It was treated with NaOCl as described in Example 6, the pure product showing a N.E. of 109.

Example 9

A solution of 200 g. of 2,3-dimethyl naphthalene and 4.5 g. of Se in 2000 g. of trichlorobenzene was heated to 185° C. in the flask described in Example 5. $NO_2$ gas was introduced at the rate of 2 g. per minute while maintaining the temperature between 185° and 192° C. until 58 g. of water was recovered in the condenser from the exit gases, which remained practically colorless until substantially the end of the reaction, showing that the reduction of the $NO_2$ was virtually complete. The contents of the flask were cooled, the solids recovered therefrom by filtration, washed with isooctane and then with water, and dried. The product weighed 184 g. and showed a N.E. of 98, which is theoretical for 2,6-dicarboxy-naphthalene anhydride.

Example 10

2-methyl-6-acetonaphthalene was boiled with an excess of 2% NaOCl in NaOH aqueous solution to form 2-methyl-6-carboxy naphthalene. 20 g. of the product was dissolved in 500 cc. of trichlorobenzene with the addition of 1 g. of Se and maintained at 190° C. Oxidation was conducted by passing in $NO_2$ gas as described above. There was obtained 15 g. of product having a N.E. of 112 and being largely 2,6-dicarboxy naphthalene.

From the above examples it is clear that the alkyl naphthalenes may be oxidized wtih $NO_2$ gas at elevated temperatures to produce carboxylic acids with good yields. In the case of the dimethyl naphthalenes the products may show some coloration, indicating the presence of impurities which for some purposes would be undesirable. However, when Se is present during the oxidation reaction, the crude products have a very light color which is readily eliminated by the treatment with NaOCl in alkaline solution.

The concentration of the alkyl naphthalene may vary considerably and it has been found that up to about 25% is practical. Substituted alkyl naphthalenes are suitable provided that they do not interfere with the desired reaction; for instance, one or more halogens, such as chlorine, or nitro groups may be present. The starting material may have other alkyl groups than methyl as they are also amenable to the present process. The process is susceptible of continuous operation with recycling of solvent, Se, and $NO_2$.

In another embodiment, the invention is directed to the production of oxidation products of alkyl benzenes and derivatives thereof, and more particularly to the formation of mono- and poly-carboxylic acids therefrom.

Previously such alkyl benzenes as p-xylene were oxidized with dilute nitric acid at elevated temperatures and high pressures, up to about 500 pounds per square inch to form terephthalic acid. In some cases the nitric acid was added in small increments and even dropwise in order to avoid the formation of undesirable by-products but the process was long and tedious. Often air and oxygen was introduced into the reaction to facilitate the oxidation. While some of these processes have been used in commercial production, they suffer from disadvantages. For instance, the use of high pressures makes it necessary to provide special equipment and the operation thereof becomes more expensive. The nitric acid is consumed in the process and there is generally little or no recovery possible of the nitrogen gases formed in the reaction, which increases the cost of production. Where the process requires a number of hours, the capacity of the apparatus is relatively small so that a greater investment is required for a given output. Acid-proof equipment is necessary to avoid corrosion.

The present invention is intended and adapted to overcome the disadvantages inherent in prior processes for the production of aromatic carboxylic acids from alkyl benzenes, it being among the objects thereof to provide a process which is rapid and economical, wherein the yields of products are high, and the recovery thereof is simple.

It is also among the objects of the invention to devise a process for the stated purpose which is easily controlled, not requiring highly skilled operators nor special equipment.

It is further among the objects of the invention to provide an operation in which there is practically complete recovery of the oxidizing agent and in which the products of the reaction are in substantially pure state.

In practicing the present invention the starting material is an alkyl benzene, usually having one or more methyl groups attached to the benzene ring although other alkyl groups having up to 6 carbon atoms or more, are equally suitable in the process. The starting material is dissolved in a solvent which is inert to $NO_2$ at the elevated temperatures utilized in the reaction. It has been found that various chlorinated benzenes are eminently suitable but preferably those having 2 to 4 chlorine atoms are used, although higher or lower chlorinated benzenes may be used. Also usable under certain conditions are such solvents as nitrobenzenes, diphenyl ether, chlorinated diphenyls, and others which are sufficiently inert and have boiling points above the temperatures involved in the reaction.

A considerable range of temperatures may be used in the reaction. The minimum temperature for commercial operation is about 125°–140° C. and preferably it ranges from about 160° to 200° C., although higher temperatures up to the decomposition points of reactants and products of reaction may be used. The temperatures are above those at which $N_2O_4$ is largely dissociated into $NO_2$ as the latter is the effective oxidizer. In the reaction the $NO_2$ is substantially completely reduced to NO making the recovery thereof and reconversion to $NO_2$ a simple and complete operation, so that it is re-cycled with practically no loss. This is an important aspect of the invention from the commercial and economic aspect.

Generally, the operation of the present process may be exemplified by the oxidation of p-xylene to produce terephthalic acid or its intermediate p-toluic acid. The p-xylene may be dissolved in trichlorobenzene to provide a 5% to 20% solution. The solution is heated to about 160°–170° C. at atmospheric pressure and $NO_2$ gas bubbled through the solution. As the oxidation proceeds, the exothermic heat developed is removed by cooling so as to maintain the desired temperature. The $NO_2$ is reduced practically completely and the exiting NO gas is substantially colorless. P-toluic acid is formed. The temperature is then raised to about 190°–200° C. and the operation is continued until the conversion to terephthalic acid is complete. Since it is insoluble in the medium it may be removed from the slurry, washed and dried. The initial heating may be to about 190°–200° C. whereby the terephthalic acid is formed directly.

Because of the physical condition of the slurry, the separation of terephthalic acid may be conducted hot in a centrifuge equipped with a stainless steel screen. The filtrate contains both p-xylene and p-toluic acid and is returned to the reaction. Usually the $NO_2$ is introduced in a steady stream, and at the temperature of the reaction vaporization of p-xylene and trichlorobenzene takes place, and water vapor is formed; they are condensed and the p-xylene and trichlorobenzene are returned to the reaction, usually continuously. Fresh p-xylene may be introduced at the rate at which it is oxidized and the $NO_2$ at the rate at which it is reduced. This makes possible a continuous operation.

The efficiency of consumption of $NO_2$ sets the production rate of the terephthalic acid and the rate of removal of the slurry determines the slurry density in the reactor. It is desirable to keep this density low and the rate of removal of the slurry is gaged by this factor, whereby the operation can become practically automatic.

As indicated above, the reaction may be in two stages, which are conducted in separate reactors. In such case the p-xylene escaping from the first reactor is condensed and refluxed into it. The reaction mixture in this reactor containing p-toluic acid, p-xylene and trichlorobenzene may be continuously withdrawn and introduced into the second reactor. Any p-xylene stripped from the second reactor is condensed and returned to it. The slurry is removed from this reactor, filtered, and the filtrate returned to the first reactor. The concentration of p-toluic acid remains below its saturation point throughout the process. The substantially pure terephthalic acid is washed with the inert solvent to remove p-toluic acid and then with naphtha or benzene to remove the solvent.

Because of the high efficiency of the reduction of the $NO_2$ it becomes feasible to reconvert it by a simple and economical step. The effluent gases which are free from oxygen are cooled to condense the water vapor therefrom; then the gases may be further dried by passing through silica gel. Since NO which is free from $NO_2$ is insoluble in water and there is no oxygen present, there is no loss of NO in this step. The stream of water-free gas containing NO is mixed with dry air or oxygen and passed through a bed of silica gel which is cooled to absorb the heat of oxidation generated, and the $NO_2$ is absorbed onto the silica gel. Thereafter the silica gel is heated to drive off the $NO_2$, which is returned to the cycle. The $NO_2$ may be condensed for storage or it may be fed directly into the reactor, thus completing the cycle.

The apparatus used in the following examples is essentially a 3-liter resin flask equipped with a stirrer and having baffles along the sides thereof. An inlet for $NO_2$ reaches near the bottom of the flask and another similar inlet is provided for a solution of the alkylbenzene. An overflow near the top provides for the removal of the oxidized mixture. A reflux condenser at the top of the flask returns condensed vapors (other than water) to the flask for reuse in the reaction.

The following are specific examples of the operation of the invention without limiting the scope thereof.

*Example 11*

200 g. of p-xylene were dissolved in 2000 cc. of trichlorobenzene heated to 152° C. in the flask. Gaseous $NO_2$ was admitted at a rate of about 1.8 g./min. for a period of about 2 hours during which time the temperature rose from 152° C. to 167° C. without external heating. During this period some p-xylene distilled over and was returned to the reactor at the end of the period. Also during this period practically all of the $NO_2$ introduced into the reactor was used up leaving very little to appear in the exit gases. 28 g. of water condensate were removed from the exit gases. The rate of $NO_2$ introduction was then increased to about 2 g./min. and the temperature raised slowly to 185° C. over a period of 50 minutes during which time the small amounts of p-xylene that distilled over were returned to the reactor and at the end of which time solids formation appeared in the reactor. The rate of $NO_2$ admission was maintained for an additional 2 hours over which time the temperature was slowly raised to 197° C., and the color of the exit gases showed increasing proportions of $NO_2$ and considerable solids accumulated. The contents of the reactor were then removed, cooled, and the solids separated by filtration, washed with isooctane and dried. The weight of the dry solids was 243 g. and the N.E. was 87.8 The solids contained 86% terephthalic acid and 14% p-toluic acid.

*Example 12*

200 g. of p-toluic acid were dissolved in 2000 cc. of trichlorobenzene heated to 190° C. in the flask. Gaseous $NO_2$ was introduced at a rate of 1.8 g./min. for a period of 30 minutes at which time solids appeared in the reactor and the temperature had risen to 197° C. The reaction was carried on for a further 2 hours during which time the color of the exit gases showed a rise from practically no $NO_2$ content to a dark brown and the temperature rose to 200° C. The reactor was then emptied, the contents cooled, the solids separated by filtration, washed with isooctane and dried. The weight of the dry solids was 146 g. and showed an N.E. of 34.4.

Two things become apparent from the above examples. The first is that terephthalic acid is quite insoluble in the hot inert solvent whereas the p-toluic acid is very soluble in it. This permits the continual removal of substantially pure terephthalic acid on one hand and the recycle of the solution of p-toluic acid on the other, giving very high yields of terephthalic acid from p-xylene or p-cymene. The second thing is that in the early stages of the batch runs, the exit gases from the reactor are comparatively free of $NO_2$. This completeness of reaction of the $NO_2$ is a function of the concentration of the organic reactants in solution. By proper recycle of p-toluic acid and addition of p-xylene it is possible to maintain the reactant concentration to the point where substantially all of the $NO_2$ is reacted. The efficiency of utilization of $NO_2$ is also a function of the design of the equipment used for contacting the $NO_2$ gas with the reactant solution.

*Example 13*

200 g. of p-cymene were dissolved in 2000 cc. of trichlorobenzene and heated to 170° C. in the flask. Gaseous $NO_2$ was introduced at a rate of 2 g./min. for 2½ hours during which time the temperatures rose to 180° C. and 53 g. of water condensate were accumulated. The exit gases were practically colorless. The amount of water trapped points to the probability that the isopropyl group is the first to be oxidized. The $NO_2$ introduction was continued at a rate of 2 g./min. at temperatures between 182° and 185° C. for another 2½ hours during which time the effluent gases became colored showing the escape of some $NO_2$. The contents of the flask were cooled, filtered, the solids, largely terephthalic acid, washed with isooctane and dried. The weight of the dry solids was 85 g. and their N.E. was 84.8.

*Example 14*

200 g. of pseudocumene were dissolved in 2000 cc. of trichlorobenzene and heated to 165° C. in the flask. Gaseous $NO_2$ was introduced at a rate of 2 g./min. for 2 hours during which time the temperature rose to 181° C., 30 g. of water condensate were accumulated and the effluent gases were colorless. The $NO_2$ introduction was continued at the same rate and the temperature slowly raised to 192° C. over an additional 5 hours, during which time the effluent gases became colored showing the escape of some $NO_2$. The contents of the flask were cooled, filtered, the solids washed with isooctane and dried. The dry solids weighed 211 g. and had a N.E. of 74.2, showing this to be largely trimellitic acid.

Other alkyl benzenes may be treated in a manner similar to the above examples. For instance, ortho- and meta-xylenes have been oxidized by the procedure of Example 11 to form phthalic and isophthalic acids, respectively; similarly in accordance with Example 12, ortho- and meta-toluic acid have been oxidized to phthalic and isophthalic acids, respectively. By following Example 12, p-nitro toluene has been oxidized to p-nitro benzoic acid; and in accordance with Example 13, p-chloro toluene has been oxidized to p-chloro benzoic acid. Similarly, the reactions may be conducted for partial oxidation so that not all of the alkyl groups are converted to carboxylic groups. Isomers of the polyalkyl benzenes of the specific examples may be similarly treated, such as oxidation of durene to pyromellitic acid. Such alkylated benzenes which have substituent groups, other than alkyl and which do not interfere with the oxidation, are usable in the process. In some cases, the anhydrides of the acids may be produced.

In another embodiment, the invention is directed to the production of anthraquinone from anthracene, and more particularly by a process wherein $NO_2$ is used as the oxidizing agent.

In the past it has been proposed to oxidize anthracene to the quinone by dissolving it in acetic acid and contacting the solution with nitrous gases. This process was not sufficiently effective to warrant actual production, various oily by-products were formed, nitration took place, and recovery of anthraquinone from the solvent and by-products was quite difficult and expensive.

Another prior process provided a mixture of anthracene with nitrous oxide, and basic zinc or copper oxides, the mixture being heated to 250–350° C. in a stream of air or oxygen, which was the oxidizing medium. The anthraquinone formed was sublimed and recovered. This process was not practical, the reaction was slow, and it resulted in a low yield. The long time at the high temperature caused decomposition. The constituents, such as anthracene and the metal oxides, being solids there was insufficient contact between them, the nitrous oxide and the oxygen, as a result of which conversion to anthraquinone was incomplete, so that it could not be used for commercial production. To prevent the formation of by-products, it was attempted to dilute the mixture with powdered pumice, asbestos or glass wool and to introduce zinc dust or lead oxide to take care of nitric acid formed in the operation, but this did not lead to a successful process as the yields were poor.

The present invention is intended and adapted to overcome the disadvantages inherent in prior processes for the oxidation of anthracene to anthraquinone, it being among the objects thereof to devise a process for the stated purpose which is simple and highly effective.

It is also among the objects of the invention to provide a process which is rapid, gives a high yield of product of high purity, which is adapted for continuous operation, and which does not require expensive or complicated equipment nor highly skilled operators.

It is further among the objects of the invention to so conduct the reaction using $NO_2$ as the oxidizing medium that the resulting nitrogenous gases may be practically all recovered in a state for reconversion to $NO_2$ for recycling in the system without loss in side reactions.

In practicing the invention, a solution is made of anthracene in a solvent which is inert to $NO_2$ at the elevated temperatures utilized in the reaction. Most organic solvents react with $NO_2$ under the relatively high temperature conditions, but it was found that chlorinated benzenes are excellent for the purpose. Among these compounds the mono- to tetra-chlorobenzenes are quite suitable, including the mixed tetrachlorobenzenes. The solvent should remain liquid at the reaction temperatures which are those at which $N_2O_4$ is largely dissociated. Other solvents which have been found usable although they may show some reaction at the higher temperatures used include nitrobenzene, diphenyl ether and chlorinated diphenyls. Still other solvents may be used in the operations.

More specifically, the temperature should be above about 125°–140° C. and preferably above about 180° C., and up to the point where decomposition may become a factor. The oxidizing medium is $NO_2$ in the gaseous state. A solution containing, say 5% to 15% of anthracene is held at the desired temperature and an amount of $NO_2$ sufficient for the formation of anthraquinone is introduced in finely divided form into a reactor provided with adequate agitation at such a rate that substantially all the $NO_2$ is reduced to NO and the exit gases are practically free from the red-brown color of $NO_2$. The reaction is rapid and goes to practical completion in a matter of minutes. It lends itself readily to a continuous operation. The anthraquinone produced is of high quality and almost quantitative yields are obtained.

After the completion of the reaction, the solvent containing the suspended anthraquinone is cooled and filtered. The product is washed with a volatile organic liquid which does not react in order to remove the inert solvent, and the product is dried.

With the present process, the recovery of the $NO_2$ used in the operation may be recovered for re-use. Because the residual gases from the reaction are practically free from $NO_2$, the NO can be treated for substantially complete regeneration of $NO_2$. The effluent gases are cooled and freed from water produced in the reaction as well as vapors of solvent, by passing through a condenser at the proper temperature. The gases leaving the condenser are further dried by being passed through silica gel, thus avoiding any loss of nitrogen gases since NO is insoluble in water and practically no oxygen or $NO_2$ is present. Then the NO gas is mixed with oxygen or air in sufficient amount to oxidize NO to $NO_2$ and passed into a cooled bed of silica gel which catalyzes the oxidation and adsorbs the $NO_2$ formed. To release the $NO_2$ for re-use the silica gel is heated.

*Example 15*

A solution of 178 parts by weight of 95% anthracene in about 2000 parts by weight of trichlorobenzene are placed in a 3-liter resin flask fitted with agitator, baffles, gas inlet and outlet tubes. Gaseous $NO_2$ at about 195° C. is introduced at the bottom of the flask and is finely dispersed by the action of the agitator and baffles. The rate of introduction is about 2 parts by weight per minute, which requires about 90 minutes. After the accumulation of about 16 parts by weight of water, the exit gases begin to show a brownish tinge showing the reaction to be complete. The reaction mixture is then cooled to room temperature, the anthraquinone filtered off and washed with iso-octane to remove the residual solvent, and then dried. The product is 188 parts by weight having a melting point of 280°–281° C.

The preceding example does not limit the invention as various changes may be made in the details of the operation. For instance, the rate of addition of $NO_2$ may be greatly increased in properly designed apparatus and the reaction completed in a few minutes. Higher temperatures also reduce the time of reaction. In the start of the process the solution of the anthracene may be heated to the desired temperature to initiate the reaction and then, as the exothermic heat develops, cooling of the reaction vessel may be resorted to. Other inert solvents, such as the mixed tetrachlorobenzenes may be used. The concentration of the anthracene may be varied. Higher temperatures up to about 250° C. are feasible if precautions are taken to avoid loss of solvent and decomposition. The operation may be conducted under super-atmospheric pressures. Various other details may be altered without departing from the principles involved herein.

Prior processes using nitrogen compounds were unable to produce anthraquinone free from nitrogen-containing products, whereas a very pure anthraquinone results from this invention. In the present process the residual NO gases being substantially free from $NO_2$ are readily re-oxidized for return to the cycle, thus effecting economy in operation. The yield of anthraquinone is quite satisfactory.

In another embodiment, the invention is directed to the production of selenium dioxide ($SeO_2$) from selenium, and more particularly to a process which is highly efficient and economical.

Selenium dioxide, as such or in the form of selenious acid is a known oxidizing agent for organic and inorganic substances. For instance, the acid will oxidize sulfurous acid to sulfuric acid. In producing $SeO_2$ in the prior art, elemental Se was heated in concentrated nitric acid to cause the Se to become oxidized. Too much nitric acid was consumed in the operation and was wasteful of nitric acid. Also, great care had to be exercised to prevent explosions.

In another prior art process, the Se was treated with air or oxygen at high temperatures in the presence of traces of nitrogen oxides as catalyst, the resulting combustion producing $SeO_2$. The oxidation took place at temperatures well above 217° C., the melting point of Se, and the $SeO_2$ was recovered by sublimation which introduced difficulties. As a result, the production of large quantities of $SeO_2$ by either of the above methods left much to be desired.

The present invention is intended and adapted to overcome the difficulties inherent in the prior method for producing $SeO_2$ from Se, it being among the objects thereof to provide a process which is simple, rapid, does not require complicated or expensive equipment, and gives a high yield of $SeO_2$ in pure form.

It is also among the objects of the invention to provide a process for the stated purpose in which the reaction to produce $SeO_2$ may proceed simultaneously with the oxidation of an organic substance by the $SeO_2$ so formed.

It is further among the objects of the invention to devise a process in which gaseous $NO_2$ is used to oxidize the Se and the NO formed thereby may be recovered as $NO_2$ for reuse.

The invention is based upon the fact that Se is soluble to some extent in certain organic solvents, more particularly in halogenated hydrocarbons, specifically chlorinated aromatic compounds such as chlorobenzenes carrying from 1 to 6 chlorine atoms. While the solubility of Se is very small at room temperatures, it increases to a substantial degree at temperatures at from about 130° C. to 230° C. Other chlorinated solvents are suitable including as the homologues of the chlorobenzenes, the chlorinated diphenyls, particularly those containing about 20% chlorine, and nitrobenzene. Still other solvents which are inert to $NO_2$ and $SeO_2$ at the temperatures of the reactions may be used in the process.

It has now been found that the solution of Se in the above identified solvents at elevated temperatures is readily reacted with $NO_2$, whereby $SeO_2$ is rapidly formed and is precipitated as it is insoluble in these solvents and a slurry thereof is formed which is easily filterable, the effluent NO formed in the reaction being practically colorless until substantially all of the Se has been consumed when it begins to take on the reddish color of $NO_2$. The NO may be dried to remove traces of water and then mixed with oxygen or air and passed through silica gel to regenerate $NO_2$ which may be recycled.

Since the solubility of the Se is limited, additional Se may be introduced simultaneously with the $NO_2$ in proper proportions, or preferably a considerable excess of Se may be introduced into the solution and the reaction proceeds with the continuous dissolving of Se and precipitation of $SeO_2$ until the Se has become exhausted. When undissolved Se no longer remains, the slurry is filtered while hot so that there is no contamination of the $SeO_2$. The filtrate is reused for the further production of $SeO_2$. Thus the reaction lends itself to continuous operation and close control.

The $SeO_2$, being in a readily filterable state, is usually separated in a centrifuge to form a cake which has a low solvent content. The residual solvent is washed out with Se-free hot solvent, and the latter is washed out with a low boiling solvent such as benzene or naphthas.

In dissolving the Se in the solvent as the temperature is increased from room temperature to say about 190° to 200° C., the colorless solution passes through yellow to reddish and at the saturation point it is deep red. Higher temperatures than 200° C. may be used but such temperatures should be below those at which the solvent vaporized under the conditions of the operation. It is preferred to conduct the oxidation between 160° and 200° C.

The following are specific examples of the operation of the invention:

*Example 16*

A 3-liter resin flask is fitted with a downdraft propeller agitator near the bottom thereof. An inlet is provided for introduction of solvent and Se. A gas inlet tube extends down to a point just above the propeller. An exit tube is connected to a reflux condenser adjusted for the condensing and return of vaporized solvent.

2000 cc. of trichlorobenzene are placed in the flask and 50 grams of Se introduced therein. Heat is applied to raise the temperature to 185° C. $NO_2$ is introduced at the rate of 1.5 grams per minute, the effluent gas remaining practically colorless showing practically complete reduction of the $NO_2$ to NO until the Se in solution was fully oxidized. The end of the reaction is indicated by the reddening of the exit gases. The slurry of $SeO_2$ is removed, and filtered in a dry atmosphere, washed with trichlorobenzene, then with benzene, and finally dried, yielding substantially pure $SeO_2$.

*Example 17*

In the apparatus of Example 16, 2000 cc. of trichlorobenzene are introduced containing 14 grams of $SeO_2$. It is heated to 195°–200° C. and ethylene gas is passed into the slurry. The reaction is very rapid as shown by the fact that the solution begins to redden immediately upon the introduction of the ethylene, showing that Se is formed and is in solution. In about 10 to 15 minutes all of the solid $SeO_2$ in suspension disappears and a clear red solution is obtained. The water formed in the reaction is condensed and it contains glyoxal which is the product of the reaction.

*Example 18*

In the apparatus of Example 16, there is introduced into the flask a mixture of 2000 cc. of trichlorobenzene and 10 grams of Se. Only a part of the Se goes into solution as the temperature is raised to 195° C. forming a deep red solution. Ethylene and $NO_2$ are flowed in through the gas inlet, the $NO_2$ at such a rate that it attacks the Se in preference to attacking the ethylene, so that oxidation thereof takes place by the $SeO_2$ and not by the $NO_2$. Therefore, the formation of by-products by direct oxidation of ethylene by $NO_2$ is largely avoided. The water formed in the reaction contains glyoxal.

Various types of organic compounds may be oxidized as set forth above, such as acetaldehyde to glyoxal, benzyl alcohol to benzaldehyde, camphor to camphorquinone, diphenylmethane to benzophenone, and fluorene to fluorenone. When the products of the oxidation are volatile at the temperature of the operation, they may be removed from the solution by evaporation. In other cases they may be recovered by other means, such as cooling and filtration. In certain instances the organic reactant may be added to the inert solvent bearing the Se during the introduction of the $NO_2$, where $NO_2$ does not form undesirable reaction products with the organic reactant or a product of reaction in the presence of Se or $SeO_2$.

There are several advantages flowing from the invention. The reaction of $NO_2$ with dissolved Se is very rapid and complete. $SeO_2$ formed in the reaction is readily separable from the mixture. The yield of $SeO_2$ is high and it is in substantially pure state. No complicated equipment is involved and the control of the conditions is simple, so that relatively unskilled chemical workers may operate the process with good efficiency. Cycling the NO to re-form $NO_2$ is quite valuable in commercial operations in reducing cost of processing.

The invention claimed is:

1. A method of producing $SeO_2$ which comprises: dissolving elemental Se in an organic solvent inert to $NO_2$ and $SeO_2$ at elevated temperature, said solvent being selected from the group consisting of halogenated aromatics and nitrobenzene maintaining a temperature above about 130° C. and below the vaporization temperature of the solvent, and introducing $NO_2$ into said solvent containing dissolved Se, whereby $SeO_2$ is formed by oxidation of Se with $NO_2$ and is precipitated as a slurry.

2. Method according to claim 1 wherein said temperature is between about 130° C. and 230° C.

3. A method according to claim 1 characterized in that the $SeO_2$ formed is separated from said solvent and washed.

4. A method according to claim 1 characterized in that an excess of Se in undissolved form is present during at least the initial stages of said oxidation.

5. A method according to claim 1 characterized in that an organic compound oxidizable by $SeO_2$ is present during said oxidation said organic compound being selected from the group consisting of ethylene, acetaldehyde, benzyl alcohol, camphor, diphenylmethane and fluorene.

6. A method according to claim 5 characterized in that the rate of additon of $NO_2$ is such that it attacks the Se but is insufficient in amount to react with said organic compound.

7. A method according to claim 1 wherein NO is a product of the oxidation of Se with $NO_2$, said NO being removed, regenerated to $NO_2$ and recycled into said solvent.

References Cited by the Examiner

UNITED STATES PATENTS 2,616,791  11/1952  Roseman et al. _____ 23—139

OTHER REFERENCES

Barnes, Journal of the Indian Chemical Society, volume 9, 1932, pages 329, 333.

Booth et al., Editors, Inorganic Synthesis, volume 1, McGraw-Hill Book Co. Inc., New York, 1939, pages 117–118.

OSCAR R. VERTIZ, *Primary Examiner.*

BENJAMIN HENKIN, *Examiner.*

H. T. CARTER, *Assistant Examiner.*